(12) United States Patent
Downey et al.

(10) Patent No.: US 6,851,679 B2
(45) Date of Patent: Feb. 8, 2005

(54) SIMPLIFED ADAPTIVE SUSPENSION

(75) Inventors: Doyle R. Downey, Beverly Hills, MI (US); Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Joseph Cubalchini, Jr., St. Charles, IL (US); Monte G. Williams, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 71 days.

(21) Appl. No.: 10/136,212

(22) Filed: May 1, 2002

(65) Prior Publication Data

US 2003/0205868 A1 Nov. 6, 2003

(51) Int. Cl.[7] ............................................. B60G 17/01
(52) U.S. Cl. .................................. 280/5.511; 280/5.507
(58) Field of Search ........................... 280/5.511, 5.5, 280/5.51, 5.512, 5.507, 5.508

(56) References Cited

U.S. PATENT DOCUMENTS

| | | | | |
|---|---|---|---|---|
| 3,841,653 A | * | 10/1974 | Strauff | 280/6.158 |
| 4,345,661 A | * | 8/1982 | Nishikawa | 180/421 |
| 4,588,039 A | * | 5/1986 | Uno et al. | 180/415 |
| 4,697,237 A | * | 9/1987 | Tanaka et al. | 701/38 |
| 4,811,805 A | * | 3/1989 | Yoshida et al. | 180/414 |
| 4,834,419 A | * | 5/1989 | Kozaki et al. | 280/5.503 |
| 4,930,082 A | * | 5/1990 | Harara et al. | 701/38 |
| 4,975,849 A | * | 12/1990 | Ema | 701/37 |
| 5,080,205 A | | 1/1992 | Miller et al. | |
| 5,096,219 A | * | 3/1992 | Hanson et al. | 280/5.508 |
| 5,113,345 A | * | 5/1992 | Mine et al. | 701/38 |
| 5,120,031 A | | 6/1992 | Charles et al. | |
| 5,150,775 A | | 9/1992 | Charles et al. | |
| 5,163,704 A | * | 11/1992 | Wada | 280/5.503 |
| 5,180,186 A | | 1/1993 | Charles et al. | |
| 5,257,814 A | * | 11/1993 | Kohara | 280/5.508 |
| 5,362,094 A | | 11/1994 | Jensen | |
| 5,519,611 A | * | 5/1996 | Tagawa et al. | 701/37 |
| 5,590,898 A | * | 1/1997 | Williams et al. | 280/5.507 |
| 5,691,899 A | * | 11/1997 | Terasaki | 701/38 |
| 5,749,596 A | | 5/1998 | Jensen et al. | |
| 5,987,366 A | * | 11/1999 | Jun | 701/37 |
| 6,149,166 A | * | 11/2000 | Struss et al. | 280/5.511 |
| 6,175,792 B1 | * | 1/2001 | Jones et al. | 701/37 |
| 6,182,979 B1 | * | 2/2001 | Lee | 280/5.507 |
| 6,533,294 B1 | * | 3/2003 | Germain et al. | 280/5.511 |
| 6,580,988 B2 | * | 6/2003 | Lin et al. | 701/41 |
| 6,598,885 B2 | * | 7/2003 | Delorenzis et al. | 280/5.507 |
| 2001/0030400 A1 | * | 10/2001 | Zetterstrom | 280/5.51 |
| 2002/0149161 A1 | * | 10/2002 | Smith | 280/5.507 |
| 2003/0075882 A1 | * | 4/2003 | Delorenzis et al. | 280/5.508 |

* cited by examiner

Primary Examiner—Teri P. Luu
(74) Attorney, Agent, or Firm—Carlson, Gaskey & Olds (57) ABSTRACT

An adaptive suspension system for a motor vehicle varies suspension parameters in response to steering input. The system includes a sensor to measure changes in the power assist steering mechanism that indicate a change in vehicle direction and a shock variable suspension member changed in response to a change in vehicle direction. The sensor measures pressure changes in the power assist steering system such that the suspension system is optimized to accommodate specific vehicle maneuvering. In another embodiment, the variable suspension member is in hydraulic communication with the hydraulic circuit of the power assist steering mechanism such that pressure changes caused by steering input triggers changes in the suspension system to accommodate vehicle maneuvering.

20 Claims, 6 Drawing Sheets

SIMPLIFED ADAPTIVE SUSPENSION

BACKGROUND OF THE INVENTION

This invention relates to an adaptive suspension system including a variable suspension member variable in response to steering input.

Typically, an adaptive suspension system varies the dampening rate of a motor vehicle suspension system to provide optimal handling and comfort of passengers. A suspension system optimizes ride by transferring minimum disturbance to the vehicle body and thereby the occupants. To optimize vehicle handling during a cornering maneuver the suspension system must provide forces to compensate for the roll of the motor vehicle toward the outside of the turn. However, during straight line driving the same suspension system does not need to compensate for roll.

In one known adaptable suspension system a strut that rotates with the steering mechanism changes dampening levels relative to the steering angle of the motor vehicle. This known system is impractical and limited in the range of dampening levels available due to the small steering angles experienced for most cornering maneuvers.

Typically, in other adaptive suspension system the different dampening or roll rates required to optimize vehicle handling are attained by triggering a variable dampening member based on sensor input. Typically, a sensor or switch is triggered to change suspension characteristics. Such conventional systems vary the dampening or roll rate of the suspension dependent on inputs from sensors positioned throughout the motor vehicle. The sensors measure dynamic movements of the motor vehicle such as yaw, pitch, and roll. Typically, data gathered from the sensors is forwarded to an electronic control unit that in turn signals the suspension system such that appropriate changes can be made to optimize vehicle performance and handling.

Typically, the sensors used to measure vehicle dynamics are costly, require delicate calibration, and are not feasible in production. Further, the use of sensors to measure vehicle dynamics introduces a lag time between movement of the vehicle, sensed movement and actual adjustment of the suspension system.

A known adaptive suspension system includes a sensor placed on a steering column to sense steering position along with other sensors that measure lateral body acceleration in order to activate a variable stabilizer bar. Such a system still includes the complexities of costly lateral acceleration sensors that are not feasible in production.

For these reasons, it is desirable to develop a suspension system that can vary the dampening rate depending on vehicle dynamics in a simple efficient and non-expensive manner.

SUMMARY OF THE INVENTION

The invention is an adaptive suspension system for a motor vehicle that varies to optimize vehicle handling in response to input from the steering system.

This invention triggers an adaptive suspension system based on direct steering input by the operator. Sensing changes in the steering system directly discerns driver intent without the time delay encountered from the use of roll, yaw and pitch sensors. Further, the suspension system is optimized before the vehicle begins to roll or build up cornering forces. This is accomplished by sensing changes in hydraulic pressure within the steering systems hydraulic circuit. Detection of the steering column input is accomplished by sensors disposed within the hydraulic circuit of the steering system to measure pressure changes that indicating turning of the vehicle. Data from the sensors is forwarded to an electronic control unit (ECU) such that the ECU may make needed adjustments to the suspension system.

The suspension system includes a wheel assembly suspended from the frame of the motor vehicle and at least one variable member. In one embodiment of the subject invention the variable member is a stabilizer bar having a variable length drop link. Actuation of the drop link changes the stiffness of the stabilizer bar to change the roll rate of the motor vehicle. In another embodiment of the invention, the variable member is a shock absorber having a variable dampening rate.

In another embodiment of the invention, the variable member is hydraulically connected to the hydraulic system of the steering system such that sensors are not required. In this embodiment the stabilizer bar drop link or the variable dampening shock absorber are hydraulically connected to the hydraulic circuit of the steering system. The hydraulic connection may be direct such that hydraulic fluid flows from the steering system to the variable member, or indirect such that hydraulic fluid from the hydraulic circuit of the steering system triggers activation in a second hydraulic circuit to actuate the variable member.

The suspension system of the subject invention provides the variable dampening characteristics required to optimize vehicle handling while eliminating the expense and lag time associated with the use of a plurality of external sensors.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 1A:
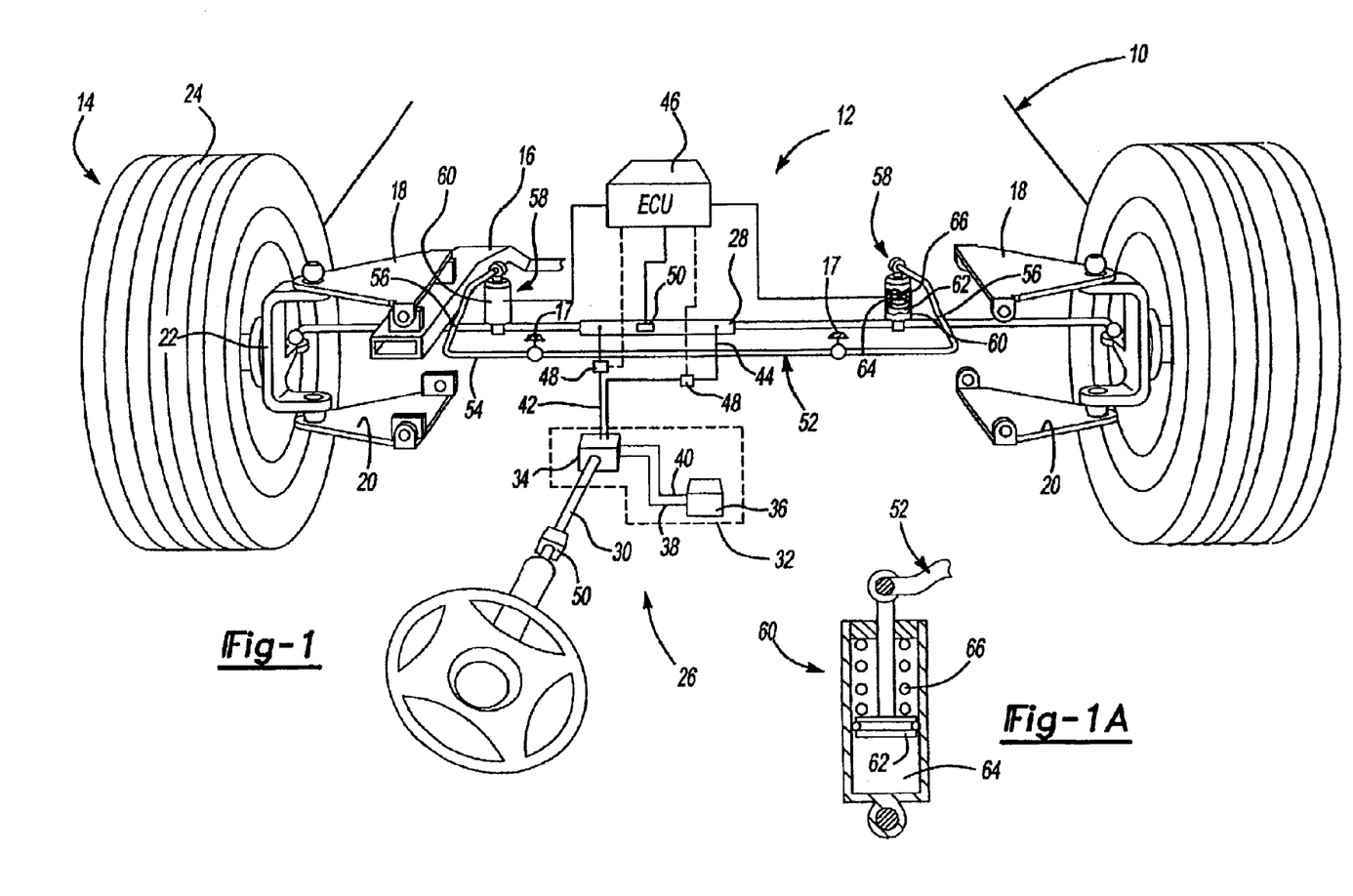
FIG. 1 is schematic drawing of a suspension system having a variable stiffness stabilizer bar.
FIG. 1A is a cross-sectional view of a hydraulic cylinder used to vary the stiffness of the stabilizer bar.

Referring to the Figures, wherein like numerals indicate like or corresponding parts throughout the several views or embodiments, the subject invention is an adaptive suspension system for a motor vehicle 10 schematically shown at 12 in FIG. 1. The suspension system 12 includes a wheel assembly 14 suspended from a frame 16 of the motor vehicle 10. Preferably the wheel assembly 14 includes upper and lower control arms 18, 20 pivotally attached to the frame 16 of the motor vehicle 10. A spindle arm 22 is pivotally attached to each control arm 18,20 opposite the frame 16 and supports a wheel 24. As appreciated, the specific configuration of the wheel assembly 14 shown is for illustrative purposes only and it should be understood that it is within the contemplation to use any wheel assembly known by one skilled in the art.

A power steering system 26 directs the front wheel assemblies 14 to steer the motor vehicle 10. The steering system 26 includes a steering rack 28 attached to the wheel assemblies 14 and is actuated by a steering column 30. The steering system 26 includes a hydraulic circuit 32 including a valve 34 and a power assist pump 36. The steering column 30 rotates to actuate the valve 34 to distribute hydraulic fluid through the hydraulic circuit 32 to the steering rack 28. The valve 34 includes input and output lines 38, 40 attached to the power assist pump 36. The valve 34 also includes left and right hydraulic lines 42, 44 that provide hydraulic fluid pressure to the steering rack 28. The power steering system 26 described here is by way of example only. The operation of the power steering system 26 is well known in the art. Further any type of power steering system 26 known in the art including rack and pinion and worm gear drive systems are within the contemplation of this invention.

A sensor measures the steering position to determine if the motor vehicle 10 is driving in a straight line or is cornering and forwards this information to an electronic control unit 46. Preferably, a pressure sensor 48 is disposed on at least one of the hydraulic lines 38,40,42,44 to measure changes in hydraulic pressure within the power steering system 26. The pressure sensor 48 can be positioned to monitor pressure on the input and output lines 38,40 between the valve 34 and the power assist pump 36. Preferably, a pressure sensor 48 is mounted to measure hydraulic pressure on each of the right and left hydraulic lines 42,44 such that a difference between pressures can be measured and forwarded to the electronic control unit 46. A worker knowledgeable in the art would understand that the position of the pressure sensor 48 to monitor hydraulic pressure may be disposed at various locations dependent on specific applications and would be within the scope of this invention.

Alternatively, a position sensor 50 may be positioned on the steering column 30 to measure angular displacement to provide information on the direction of the motor vehicle 10. A position sensor 50 may also be disposed to measure linear displacement of the steering rack 28. A worker knowledgeable in the art will recognize that there are various locations on the steering system to locate a position sensor 50 that would provide information on the direction of the motor vehicle 10, and that all would fall within the contemplation of this invention.

The suspension system includes a variable dampening member. It should be understood that any variable dampening member that changes dampening as is known by a worker skilled in the art is within the contemplation of this invention.

The variable dampening member shown in FIG. 1 is a stabilizer bar 52 including at least one-drop link 58 having a variable length. The stabilizer bar 52 includes a main section 54 that is attached to the vehicle body shown schematically at 17. Two arm sections 56 extend from each side of the main section 54 of the stabilizer bar 52 and are attached to the drop links 58. The drop links 58 are in turn attached to one of the control arms 18,20 of the wheel assembly 14. In operation, as the motor vehicle 10 rounds a turn, an arm 56 of the stabilizer bar 52 moves as a result of the movement of the wheel assembly 14 and transmits this movement through the stabilizer bar 52 to the other side of the motor vehicle 10 to control roll of the vehicle body 17. Varying the length of the drop link 58, varies the stiffness of the stabilizer bar 52 and thereby the roll rate of the motor vehicle 10. Varying the roll rate of the motor vehicle 10 with the stabilizer bar 52 accommodates different dynamic vehicle characteristics such as roll experienced during cornering of the motor vehicle 10.

The stabilizer bar 52 of the subject invention includes a hydraulic cylinder 60 to vary stiffness of the stabilizer bar 52. The hydraulic cylinder 60 varies the stiffness of the stabilizer bar 52 by changing the position of the arm sections 56 in response to a predetermined differential pressure sensed between the left and right hydraulic lines 42,44. Referring to FIG. 1A, preferably, the hydraulic cylinder 60 includes a piston 62 enclosed within a cavity 64 and biased to one direction by a spring 66. In operation when the motor vehicle 10 is traveling in a straight line the hydraulic cylinder 60 will not be activated and the stabilizer bar 52 has a first stiffness specifically configured for straight line driving. Turning the steering column 30 initiates a turn and is sensed by the pressure sensors 48. The ECU 46 will then signal activation of the hydraulic cylinder 60 to change the stiffness of the stabilizer bar, that in turn decreases the roll of the vehicle 10 caused by cornering movement of the motor vehicle 10.

Actuation of the hydraulic cylinder 60 may be in any form know in the arts such as changing orifice size or changing fluid viscosity in a magnerheological fluid. It should be understood that the various known means of varying the dampening rate of a hydraulic cylinder are within the contemplation of this invention.

Figure 2:
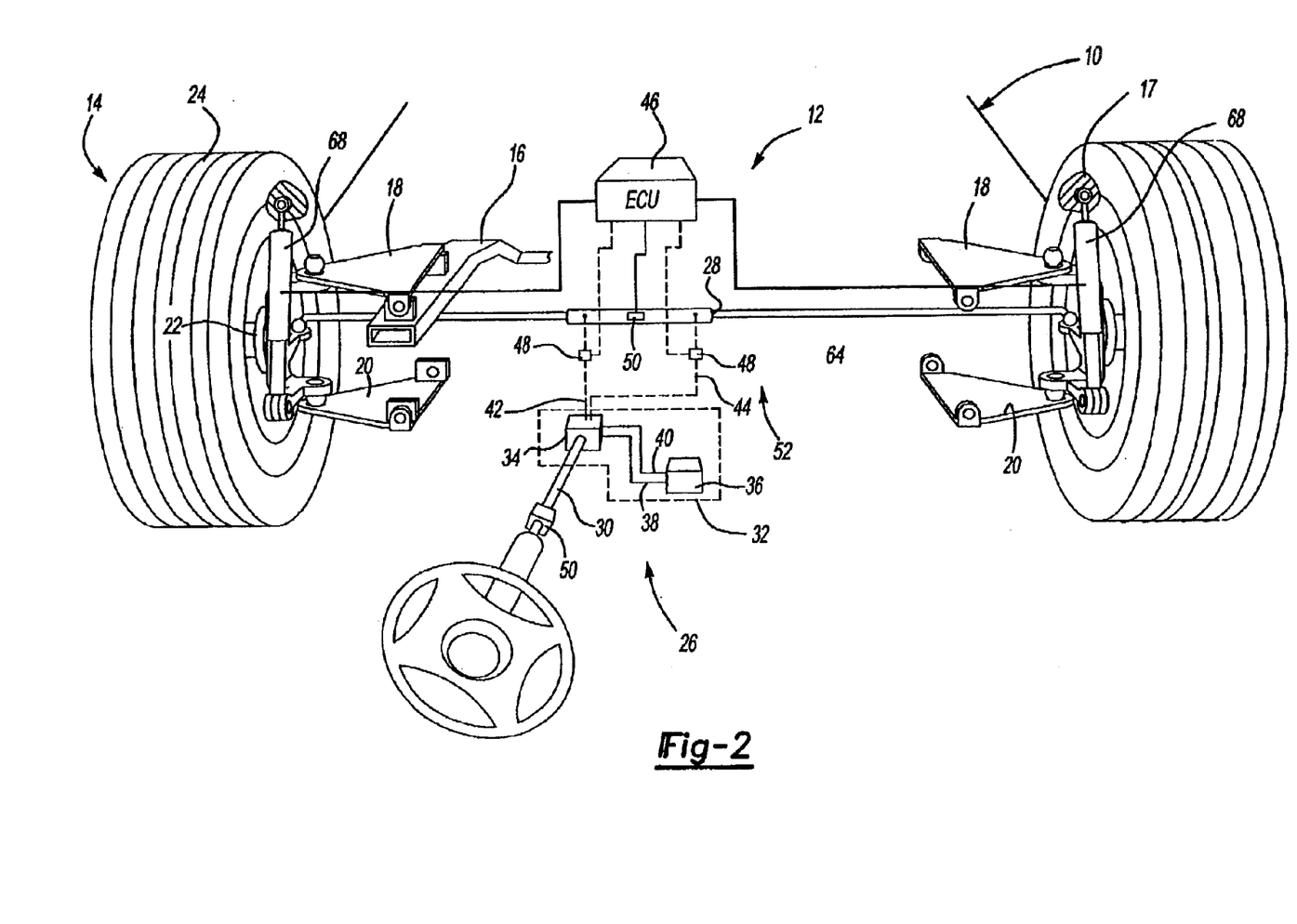
FIG. 2 is a schematic drawing of a suspension system having variable rate shock absorbers.

Referring to FIG. 2, in another embodiment of the subject invention the dampening member is a shock absorber 68. The shock absorber 68 may be of any type known in the art in which at least two distinct dampening rates may be selected. Further, the shock absorber 68 may include a continuously variable dampening rate that is changed in response to input from the ECU 46. In this embodiment the dampening rate of the shock absorber 68 is changed in response input of the steering system 26 as in the previous embodiment. The response is preferably measured by pressure sensors 48 disposed on the hydraulic lines 42, 44 of the hydraulic circuit 32. In operation, the sensors 48 detect input from the steering system 26 input upon the initiation of a cornering maneuver by an operator of the motor vehicle 10. The input from the pressure sensors 48 is forwarded to the ECU 46. The ECU 46 then actuates the appropriate shock absorber 68 to select an appropriate dampening rate such that the suspension system 12 is optimized for the specific vehicle maneuver.

Figures 3, 3A:
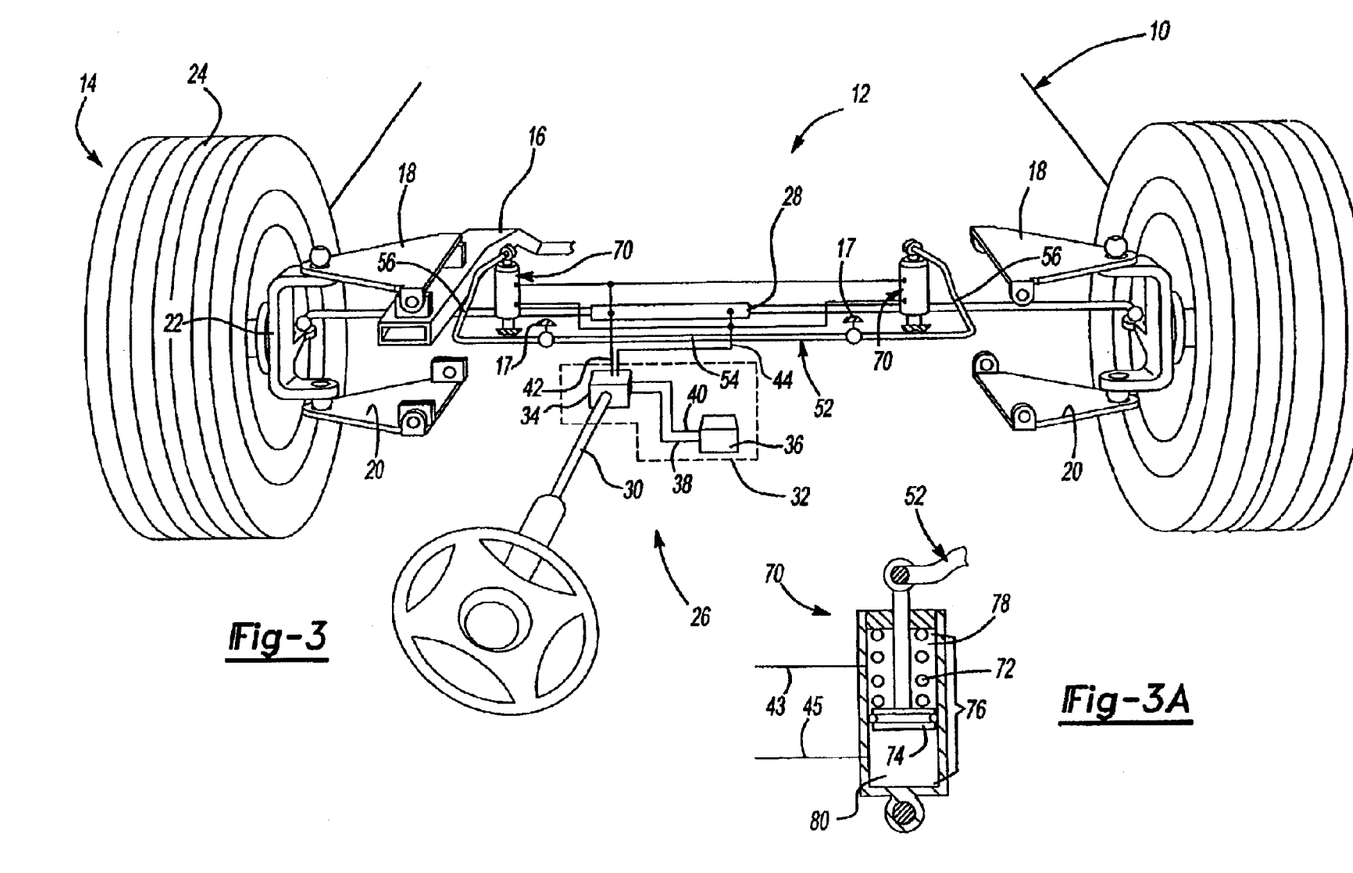
FIG. 3 is a schematic drawing showing the variable stiffness stabilizer bar hydraulically connected to the hydraulic circuit of the power assist steering mechanism.
FIG. 3A is a cross-section of the hydraulic cylinder including ports from the hydraulic system.

Referring to FIG. 3, another embodiment of the suspension system 12 includes a dampening member in hydraulic communication with the steering system 26. Hydraulic communication between the steering system 26 and the dampening member may be direct, by porting the dampening member directly to hydraulic pressure of the steering system through hydraulic lines 43 and 45.

Figure 5:
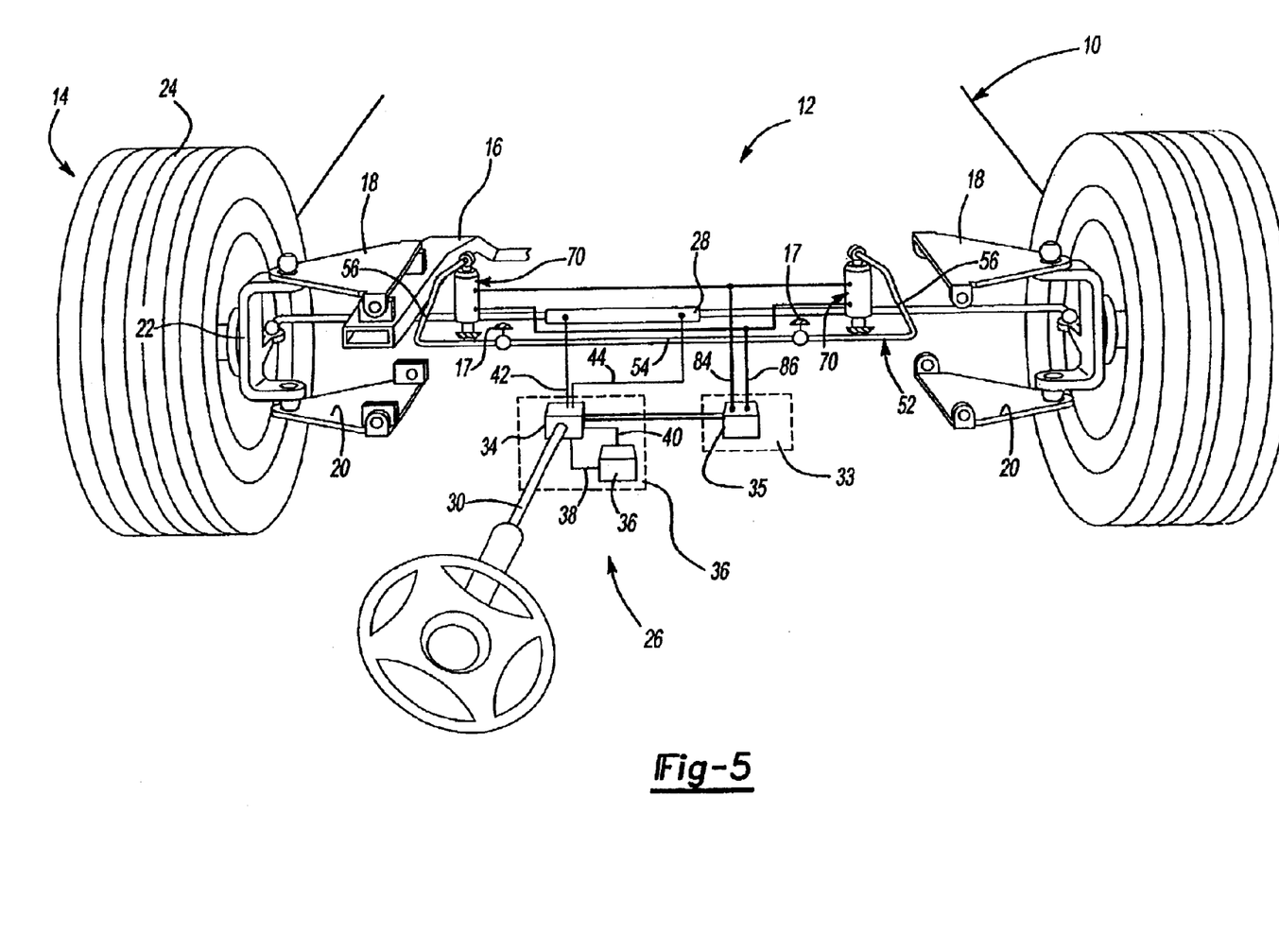
FIG. 5 is a schematic drawing illustrating another embodiment of the variable stiffness stabilizer bar including a second hydraulic circuit.

Referring to FIG. 5, alternatively, hydraulic pressure is ported to a secondary hydraulic system 33 including a valve 35 actuated by changes in the hydraulic circuit 32. In this embodiment the valve 35 would be triggered by pressure changes communicated from the hydraulic circuit 32 of the steering system 26. The valve 35 would communicate hydraulically with the hydraulic cylinders 70 by way of hydraulic lines 84,86. It should be understood that any means of hydraulically communicating pressure from the steering system to the dampening member would be within the contemplation of this invention.

Referring to FIGS. 3 and 3A, preferably the dampening member is a hydraulic cylinder 70 that is ported to the hydraulic circuit 32 of the steering system 26. Preferably the hydraulic cylinder 70 includes a spring 72 that biases a piston 74 that divides a cavity 76 into upper and lower sections 78,80. Hydraulic pressure is ported to the upper and lower sections 78,80 from the steering system. In operation, during straight line driving, hydraulic pressure is substantially equal in the left and right hydraulic lines 42,44 of the steering system, thereby the pressure within the hydraulic cylinder 70 in the upper and lower sections 78,80 would be equal and the spring 72 will bias the piston 74 and the stabilizer bar 52 to a first stiffness. Rotation of the steering column 30 by an operator to initiate a turn will increase pressure to one of the left and right hydraulic lines 42,44, thereby causing an increase in pressure in one of the upper and lower sections 78,80 of the cavity 76 causing the piston 74 of the hydraulic cylinder 70 on a corresponding side of the motor vehicle 10 to move the stabilizer bar 52 to a second stiffness corresponding to an optimal suspension setting for the cornering maneuver.

Figure 4:
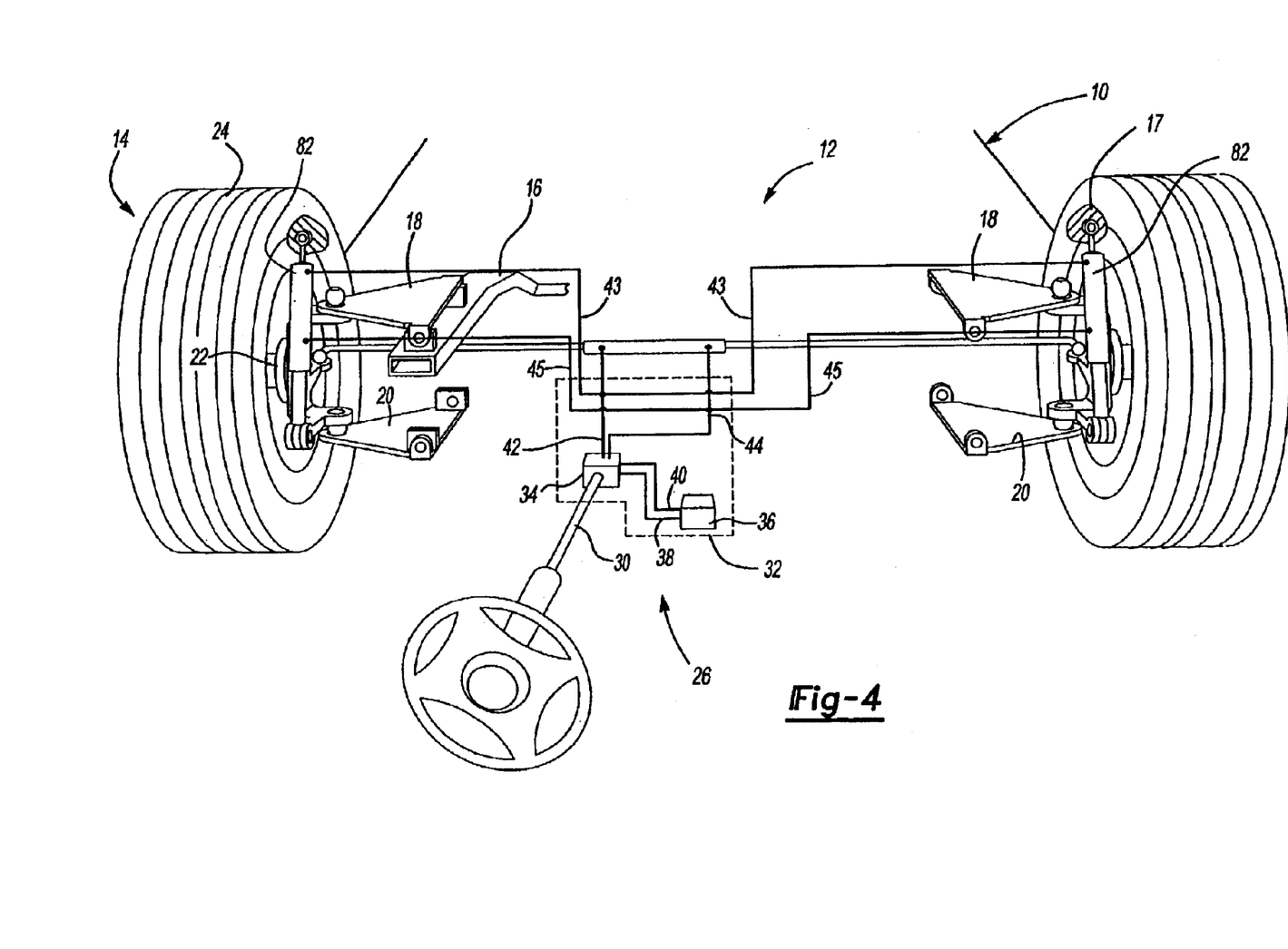
FIG. 4 is a is a schematic drawing showing the variable rate shock absorber hydraulically connected to the hydraulic circuit of the power assist steering mechanism.

Referring to FIG. 4, the dampening member is a shock absorber 82 having a variable dampening rate, the dampening rate varying in response to a hydraulic pressure from the hydraulic circuit 32 of the steering system 26. As appreciated, the shock absorber 82 may include two distinct dampening rates variable in response to a predetermined pressure from the hydraulic circuit 32 of the steering system 26. Alternatively, the shock absorber 82 may include a continuously variable dampening rate that changes in response to hydraulic pressure in hydraulic circuit 32 of the steering system 26. The specific type of variable dampening rate shock absorber 82 may be of any type known in the art. Further, the term shock absorber as used in this application referrers to all struts, and shock absorber configurations as known in the art.

Each shock absorber 82 is in hydraulic communication with the hydraulic circuit 32 of the steering system 26. Hydraulic communication between the hydraulic circuit 32 and the shock absorber 82 may be direct, by porting the shock absorber directly to the left and right hydraulic lines 42,44.

Figure 6:
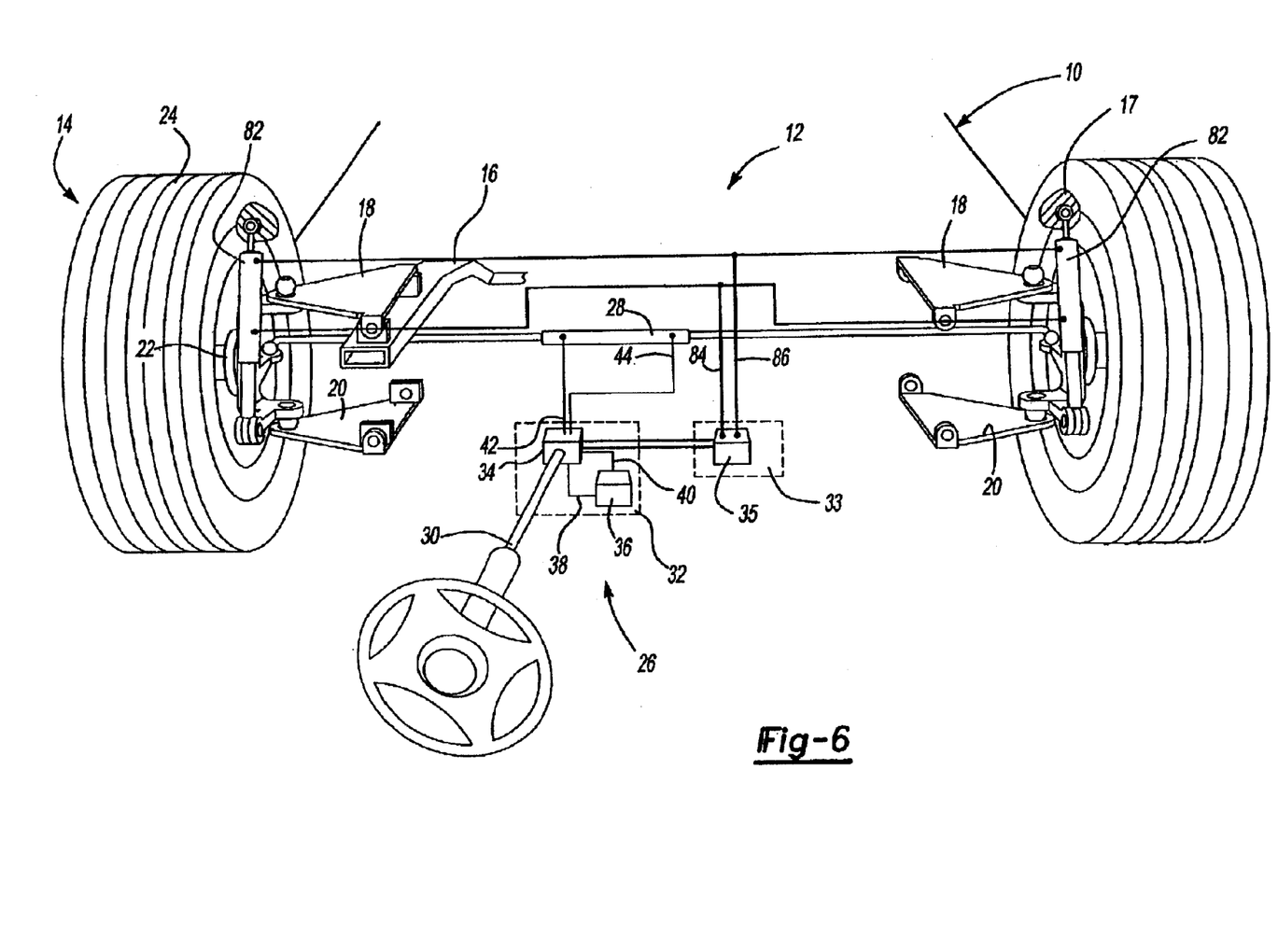
FIG. 6 is a schematic drawing illustrating another embodiment of the variable shock absorber including a second hydraulic circuit.

Referring to FIG. 6, alternatively, hydraulic pressure from the steering system 26 is ported to a secondary hydraulic system 33 including hydraulically actuated valve 35 actuated by changes in the hydraulic circuit 32 of the steering system 26. The valve 35 in turn actuates the shock absorbers 82 by way of hydraulic lines 84 and 86. It should be understood that any means of hydraulically communicating pressure from the steering system to the shock absorber 82 would be within the contemplation of this invention.

Referring to FIG. 4, the dampening rare of each specific shock absorber 82 is adjusted depending on the hydraulic pressure measured within the hydraulic circuit 32 of the steering system 26. During straight line driving of the motor vehicle 10, the difference in pressure within the left and right hydraulic lines 42,44 is substantially the same, which in turn would translate into the shock absorbers 82 being set at a first dampening rate. Input into the steering system to initiate a turn creates a difference in pressure between the left and right hydraulic lines 42,44. The differential pressure triggers a change of dampening rate in the shock absorbers 82 to optimize the overall dampening rate of the suspension system 12 to optimize dynamic handling of the motor vehicle 10.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A suspension system for a motor vehicle comprising:
   a wheel assembly suspended from the motor vehicle;
   a steering mechanism to direct the motor vehicle, said steering mechanism including a hydraulic circuit including a first hydraulic line and a second hydraulic line to provide hydraulic pressure to said steering mechanism; and
   a suspension member variable in response to a difference in hydraulic pressure between said first hydraulic line and said second hydraulic line such that said suspension member varies in response to directional changes of the motor vehicle.

2. The system of claim 1, further including a sensor disposed on said steering mechanism to measure changes in said steering mechanism.

3. The system of claim 2, wherein said sensor is disposed on said steering mechanism to measure angular displacement of a steering column.

4. A suspension system for a motor vehicle comprising:
   a wheel assembly suspended from the motor vehicle;
   a steering mechanism to direct the motor vehicle, said steering mechanism including a hydraulic circuit to provide hydraulic pressure to said steering mechanism;
   a sensor disposed on said steering mechanism to measure changes in said steering mechanism; and
   a suspension member variable in response to hydraulic pressure changes in said steering mechanism such that said suspension member varies in response to directional changes of the motor vehicle, wherein said suspension member is a stabilizer bar including a variable drop link to vary a stiffness of said stabilizer bar, said variable drop link actuated by an electronic control unit in response to said measured changes in said steering mechanism.

5. The system of claim 2, wherein said suspension member is a shock absorber including a valve actuated to change said dampening rate in response to said measured changes in said steering mechanism.

6. The system of claim 2, wherein said sensor is disposed in said hydraulic circuit to measure changes in hydraulic pressure.

7. The system of claim 6, wherein said sensor measures the difference between hydraulic pressures in said first hydraulic line and said second hydraulic line.

8. The system of claim 7, wherein said suspension member is a stabilizer bar including a hydraulically actuated cylinder to vary a stiffness of said stabilizer bar, said hydraulically actuated cylinder actuated in response to a predetermined differential in pressure between said first hydraulic line and said second hydraulic line.

9. The system of claim 7, wherein said suspension member is a shock absorber having a variable dampening rate, and said dampening rate is varied dependent on a predetermined differential pressure between said first hydraulic line and said second hydraulic line.

10. The system of claim 1, wherein said suspension member is in hydraulic communication with said hydraulic circuit and hydraulic pressure from said hydraulic circuit is ported to actuate said suspension member.

11. A suspension system for a motor vehicle comprising:
   a wheel assembly suspended from the motor vehicle;
   a steering mechanism to direct the motor vehicle, said mechanism including a hydraulic circuit to provide hydraulic pressure to said steering mechanism; and
   a stabilizer bar including a hydraulically actuated cylinder to vary the stiffness of said stabilizer bar, said hydraulically actuated cylinder actuated in response to hydraulic pressure from said hydraulic circuit such that said hydraulically actuated cylinder varies in response to directional changes of the motor vehicle, wherein said hydraulically actuated cylinder is ported to receive hydraulic pressure from said hydraulic circuit to actuate said hydraulically actuated cylinder.

12. The system of claim 10, wherein said suspension member is a shock absorber having a variable dampening rate, said dampening rate varying in response to changes in hydraulic pressure within said hydraulic circuit.

13. A suspension system for a motor vehicle comprising;
   a wheel assembly suspended from the motor vehicle;
   a steering mechanism to direct the motor vehicle by moving said wheel assembly, said steering mechanism including a hydraulic circuit including a first hydraulic line and a second hydraulic line, said hydraulic circuit actuated by a steering column;
   a variable suspension member in hydraulic communication with said hydraulic circuit and variable in response to a difference in hydraulic pressure between said first hydraulic line and said second hydraulic line of said hydraulic circuit, said variable suspension member being operably connected to said wheel assembly.

14. A suspension system for a motor vehicle comprising:
   a wheel assembly suspended from the motor vehicle;
   a steering mechanism to direct the motor vehicle by moving said wheel assembly, said steering mechanism including a hydraulic circuit actuated by a steering column;
   a stabilizer bar including a hydraulically actuated cylinder in hydraulic communication with said hydraulic circuit and variable in response to hydraulic pressure changes in said hydraulic circuit said stabilizer bar operably connected to said wheel assembly.

15. The suspension system of claim 14, wherein said hydraulically actuated cylinder includes a spring to bias a piston in a first direction, said piston moving in a second direction opposite said first direction in response to a predetermined hydraulic pressure such that said stabilizer bar includes two distinct dampening rates that vary in response to hydraulic pressure communicated from said hydraulic circuit.

16. The suspension system of claim 13, wherein said variable suspension member is a shock absorber having two distinct dampening rates variable in response to a predetermined pressure from said hydraulic circuit.

17. The suspension system of claim 13, wherein said variable suspension member is a shock absorber continuously variable in response to hydraulic pressure changes in said hydraulic circuit.

18. A method of controlling an adaptive suspension system for a motor vehicle comprising the steps of;
   a. sensing a difference in hydraulic pressure between a first hydraulic line and a second hydraulic line of a hydraulic circuit of a power assist steering system to detect a maneuver of the motor vehicle;
   b. adjusting a variable member of the suspension system in response to said sensed hydraulic pressure difference of the power assist steering system such that the suspension system is optimized for the maneuver of the motor vehicle.

19. The method of claim 18, wherein said variable member is a variable dampening shock absorber.

20. A method of controlling an adaptive suspension system for a motor vehicle comprising the steps of:
   a. sensing hydraulic pressure changes in a hydraulic circuit of a power assist of a power assist steering system to detect a maneuver of the motor vehicle;
   b. adjusting a stiffness of a variable drop link of a stabilizer bar in response to said sensed hydraulic pressure changes of the power assist steering system such that a roll rate of the motor vehicle is optimized.

* * * * *